United States Patent [19]

Haaga et al.

[11] Patent Number: 5,813,984
[45] Date of Patent: Sep. 29, 1998

[54] FORENSIC SKULL AND SOFT TISSUE DATABASE AND ON-LINE FACIAL RECONSTRUCTION OF VICTIMS AND AGE PROGESSION PORTRAIT RENDERING OF MISSING CHILDREN THROUGH UTILIZATION OF ADVANCE DIAGNOSTIC RADIOLOGIC MODALITIES

[75] Inventors: John R. Haaga, Chagrin Falls; David A. Miller, Timberlake; Joseph P. Molter, Cleveland Heights; Jeffrey L. Duerk, Avon Lake; Jonathan S. Lewin, Beachwood, all of Ohio

[73] Assignee: University Radiologists, Inc., Cleveland, Ohio

[21] Appl. No.: 812,528

[22] Filed: Mar. 7, 1997

[51] Int. Cl.⁶ .................................................. A61B 6/00
[52] U.S. Cl. ............................................ 600/410; 600/425
[58] Field of Search ........................... 600/410, 416, 600/425; 345/419, 420, 422, 429, 425, 433, 441; 707/102–104

[56] References Cited

U.S. PATENT DOCUMENTS

| | | | |
|---|---|---|---|
| 4,729,098 | 3/1988 | Cline et al. | 600/425 |
| 4,737,912 | 4/1988 | Ichikawa | 600/425 |
| 4,879,668 | 11/1989 | Cline et al. | 345/424 |
| 5,257,346 | 10/1993 | Hanson | 345/425 |
| 5,649,086 | 7/1997 | Belfer et al. | 345/441 |

*Primary Examiner*—Ruth S. Smith
*Attorney, Agent, or Firm*—Fay, Sharpe, Beall, Fagan, Minnich & McKee

[57] ABSTRACT

A method and device for generating a forensic skull and soft tissue database used for the on-line facial reconstruction of victims and age progression portrait rendering of missing children through utilization of advance diagnostic radiologic modalities.

9 Claims, 6 Drawing Sheets

FORENSIC SKULL AND SOFT TISSUE DATABASE AND ON-LINE FACIAL RECONSTRUCTION OF VICTIMS AND AGE PROGESSION PORTRAIT RENDERING OF MISSING CHILDREN THROUGH UTILIZATION OF ADVANCE DIAGNOSTIC RADIOLOGIC MODALITIES

BACKGROUND OF THE INVENTION

The present invention relates to creation of a forensic skull and soft tissue database and on-line facial reconstruction. This invention improves the forensic accuracy of facial reconstruction of unidentified victims and age progression of missing children, and expands the database of soft tissue thickness' in multiple ethnic groups and both sexes, as well as other factors such as weight and bone density, through the use of computer and medical imaging technology and will be described with particular reference thereto.

Presently, a common manner of facial reconstruction is through the use of clay models. A skull or partial skull is provided to an artist who, using approximately 26 data points will attempt to reconstruct a clay model of the facial features. These 26 points for clay modeling are specifically directed at a zero° angle, or facial view of the head. The normal process for such an undertaking is to physically ship the skull to the artisan for the reconstruction process. Such a method can take weeks to months until a result is obtained. Further, the facial reconstruction relies on subjective decision by the artist.

Preliminary studies demonstrate the feasibility of using modern imaging studies, magnetic resonance imaging (MRI) and computed tomography (CT), to advance forensic science in the realm of victim identification. Two of the victim groups which will ultimately benefit are unidentified victims with only skeletal remains and children who have been abducted.

The present invention contemplates new and improved database generation and facial reconstruction methods and devices. These methods and devices being able to be used both in an on-line environment or on-site.

SUMMARY OF THE INVENTION

In accordance with one aspect of the present invention, a method and device of generating a forensic skull and soft tissue database and for on-line facial reconstruction and age progression portrait renderings through the use of advanced diagnostic radiologic modalities are set forth. The forensic skull and soft tissue database is comprised of a large number of volunteers whose facial features have been imaged through either a CT or MRI scan. Data sets of these images which are composed of "slices" through specific adjacent anatomic locations are generated. Thereafter, data of these images are investigated so as to determine the location of the outer skin surface in comparison to the outer surface of a skull structure. Thereafter, the differences between the outer skin surface and the outer skull surface are obtained to determine the tissue depth or thickness at investigated points or locations. These samples are averaged over a large number of volunteers to obtain average samples. Thereafter, these samples are used in facial reconstruction and age progression imaging.

Facial reconstruction and age progression uses the average data, for a selected sex, race, age group in accordance with categories determined within the database.

In accordance with a more limited aspect of the present invention, the distinctions between the outer surface of the skin and the outer surface of the skull structure for the volunteer subjects, is determined by a comparison operation dependent upon the noise signals received. Particularly, the invention uses a comparison operation to compare received signals to determine whether the area investigated is a skin surface, soft tissue, or a skull surface.

One advantage of the present invention is that it allows a reduction in reconstruction time from weeks and months to as little as one day.

Another advantage of the present invention is that it allows for the reconstruction to be done in an on-line environment, whereby parties physically distant may transmit digitized information to obtain the reconstructed figure.

Yet another advantage resides in an improved reconstructed figure which more accurately represents the facial features by using a larger number of data points.

Still further advantages will be apparent to those of ordinary skill in the art upon reading and understanding the following detailed description of the preferred embodiment.

BRIEF DESCRIPTION OF THE DRAWINGS

The invention may be embodied in various steps and arrangements of steps and various components and arrangements of components. The drawings are only for purposes of illustrating a preferred embodiment and are not to be construed as limiting the invention.

DETAILED DESCRIPTION OF THE PREFERRED EMBODIMENT

1. VOLUME RENDERING: SKIN & SKULL SURFACES VIA DIAGNOSTIC RADIOLOGIC MODALITIES

Figure 1:
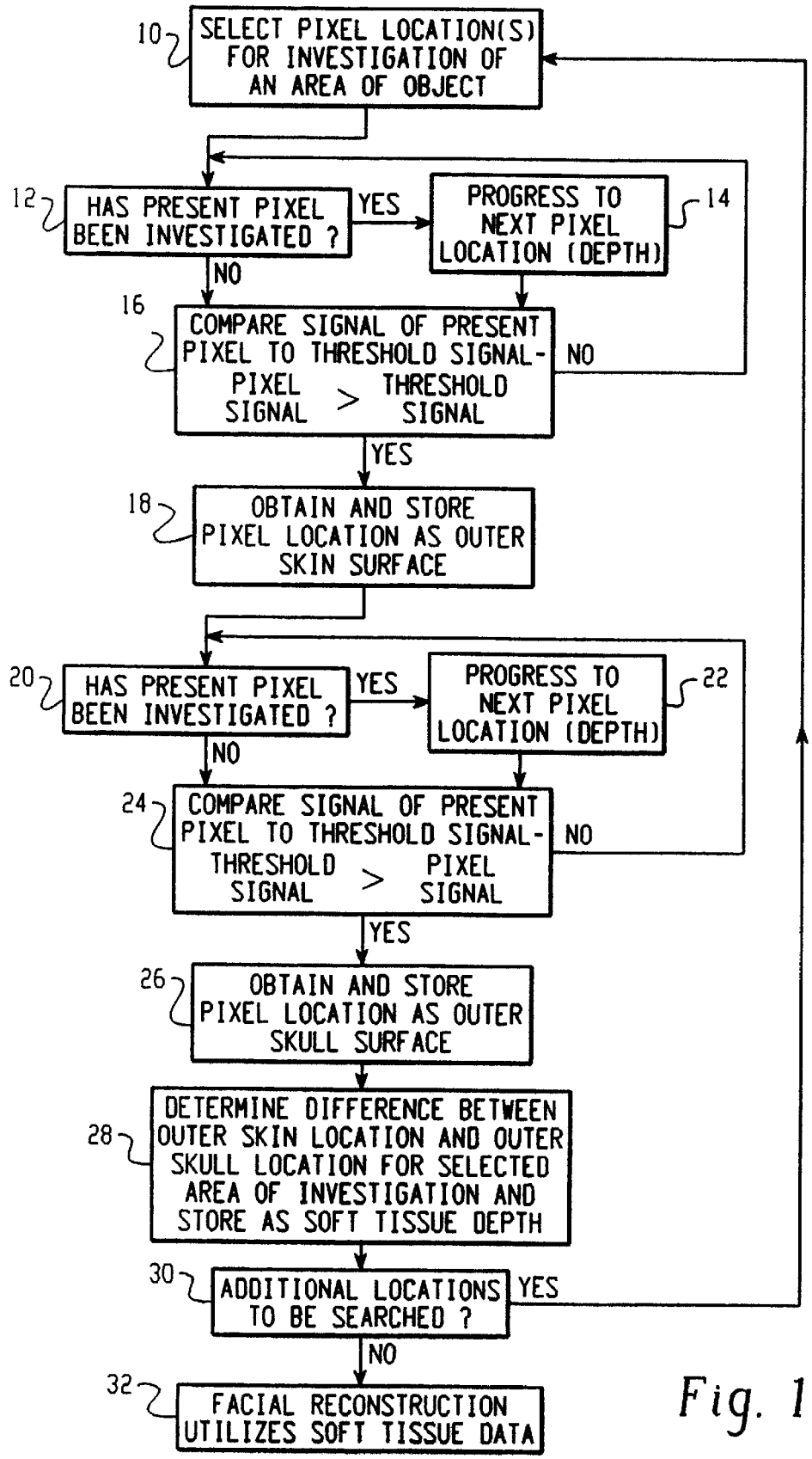
FIG. 1 illustrates a flow chart of a program to obtain tissue depth samples.

Through the use of software programs developed using Interactive Data Language software, (IDL), the inventors have created surface renderings of both the skin of a given head as well as the skull surface from MRI and CT image data sets. Each location in an image is referred to as a pixel, and image data sets are composed of "slices" through specific adjacent anatomic locations. Each image "slice" is composed of over 40,000 pixels. Rendering refers to taking the data sets, extracting selected information, then displaying this information in a recognizable fashion.

The surface rendering creates an image that represents information about the surface of the object imaged. It is displayed in a manner that creates shadows, reflections, etc., similar to a photograph using conventional illumination. For MRI data sets, this is currently achieved by adjusting a software parameter which results in either brighter pixels being chosen for the volume rendering for generation of skin renderings, or darker pixels being chosen for the volume rendering for generation of skull renderings. In the present invention, if a low side value is chosen for the adjustable parameter, the skull surface is rendered since it is composed of low pixel values which enclose high data values (brain structures). Conversely, if a high side value is chosen for the adjustable parameter, the skin surface will be rendered since it is composed of high pixel values which enclose low data values (the skull). The adjustable parameter can be used in the opposite manner for CT image data sets.

This low-side rendering is one of the unique features of the present development and allows the use of pixels of very low intensity within the MRI image data set to define the skull. That is, while MRI does not directly image bone (i.e., it does not obtain a signal from bone), the lack of information within a region is used to define the presence of bone, as needed, to create an MRI surface rendering of the bony skull via a modality which cannot directly detect such a structure. An added improvement in the skull rendering is the correction in image intensities due to surface coil spatial variability prior to the generation of the rendered data set.

Particularly, the surface coil is basically an antenna and, therefore, includes a spatial response. At some locations of the image, it is not only the soft tissue causing the pixel values to be brighter, but there is also a superposed signal that is added due to the sensitivity of the antenna. Where the antenna is not sensitive, the amplitude received could be fairly low and thereby provide incorrect output data. The system incorrectly determines that due to the lower amplitude the signal being received is noise and not, for example soft tissue. However, the lower amplitude could exist at a location due to the lack of sensitivity of the surface coil in this area and not due to the sensing of noise. The correction implemented to avoid this situation is provision of an overall scan of a uniform object which occupies the entire volume that is expected to be covered for data acquisition. The signals returned for the uniform object are known. Thereafter the results of the scan of the uniform object are spatially corrected over the global area. For example, a map of spatial intensity or variability of the coil is developed. Thereafter results are scaled in accordance with the spatial correction information.

2. TISSUE THICKNESS DETERMINATION FOR EACH FACIAL PIXEL

Since there is the ability to render the skin and skull surfaces of a given head, it is possible to determine the thickness of the tissues which lie between the skull and skin surfaces. A program has been developed which determines the tissue thickness for thousands of points on the face. For each pixel (which cover approximately one square millimeter of facial area), the program determines the outer skin surface and then progresses through the tissues until it reaches the outer skull surface. The pixel locations for both the outer skin surface and outer skull surface are registered, and the difference between the two locations determined by subtracting an x coordinate of the skin surface from an x coordinate of the skull surface. This methodology can be done for every pixel that comprises the face of the scanned head. Therefore, instead of having only the currently used 26 points of thickness for development of clay models, the subject invention supplies 10,000 or more points of thickness to be used. Thus, since the present method considers each square millimeter of area of the face rather than only 26 total points spread out across the entire face, at minimum, the accuracy of the clay modeling can be greatly enhanced, and expands the soft tissue database for future computer aided reconstruction (described later).

3. NON-FACIAL ANGLE TISSUE THICKNESS DETERMINATIONS (VARIOUS VIEWS)

An additional advancement present within the present method of determining tissue thickness is the ability to obtain the thickness' from various angles. Currently, the 26 points that have been used for the clay modeling concern only the zero degree angle, or facial view of the head. Our use of computer technology enables us to rotate a scanned head image data set by any arbitrary angle from the facial view and determine the tissue thickness for all of the pixels at that angle of the head. Further, azimuthal rotations are also possible. In other words, a 3 dimensional database of tissue thickness' can be used which takes into account over 1 million points rather than the 26 facial points used currently.

As discussed above, the computer software program of the subject development is used to define the outer surface of each subject's skin, the outer surface of each subject's skull, and the difference between the two surfaces for each subject. The distance determined between these surfaces is the soft tissue thickness.

4. ADDITIONAL DISCUSSION OF THE CONCEPTS DISCUSSED IN SECTIONS 1, 2 AND 3

The following discussion provides additional details with regard to the subject invention, including operational aspects of the program used in facial reconstruction as illustrated in FIG. 1. Particularly, it is noted that:

i) Since noise surrounds the skin surface, a threshold value is determined which will pass through the noise pixels, but will accept the outer skin surface pixels. The skin has a higher pixel value than the noise does, so there will always exist a threshold level that will clearly be above the noise level and will be appropriate to pick up the outer skin surface pixels. The program explores no further into the head once it has acquired the outermost pixel for the skin surface (see blocks 10–18 of FIG. 1).

ii) A next routine of the program moves into the head from each pixel already acquired for the outer skin surface until the skull surface is reached. Since bone is dark in MRI images (usually on the same level of noise), the routine moves into the head until it reaches a pixel which has an intensity value approximately on the same level as the noise in the images. Again, because the pixels consisting of the tissues between the skin and skull surfaces are considerably higher in intensity than the skull, the thresholding procedure allows the outer skull surface pixels to be accepted while the soft tissue pixels are passed through. The resulting 3-D matrix has 2 "tagged" pixels for every row of skin and skull that exist (see blocks 20–30 of FIG. 1).

iii) Using the resultant 3-D matrix of skin and skull surface pixels, a 2-D image representing the differences between the 2 surfaces is created. Using another routine of the program, the skin surface location for a given row can be determined and the number of pixels that are passed through until the skull surface is reached can be determined. Thus, the output would be a coronal (facial) image depicting the distances between the skin and skull surfaces for each row and column of facial/skull data that exists.

iv) The creation of a face from a given skull is then accomplished by utilizing the obtained difference data (see block 32 of FIG. 1). Assuming that an unidentified skull were to be presented, MRI and/or CT data could be acquired so as to determine the outer surface of the skull. Placing the skull in a water bath and then scanning this in the MRI machine would create slices of a dark (low intensity level) skull surrounded by the bright water medium.

It is appreciated the flow chart of FIG. 1 can be interpreted to do the tagging or storage of pixels representing the outer skin surface and then sequentially tagging the inner skull surface. However, it is also be appreciated that the program can also function by obtaining all of the pixel locations representing the outer skin surface prior to obtaining the pixels corresponding to the location of the outer skull surface. This can be done by simply including a step to obtain all the outer skin pixel locations prior to progressing to step 20.

Figure 2:
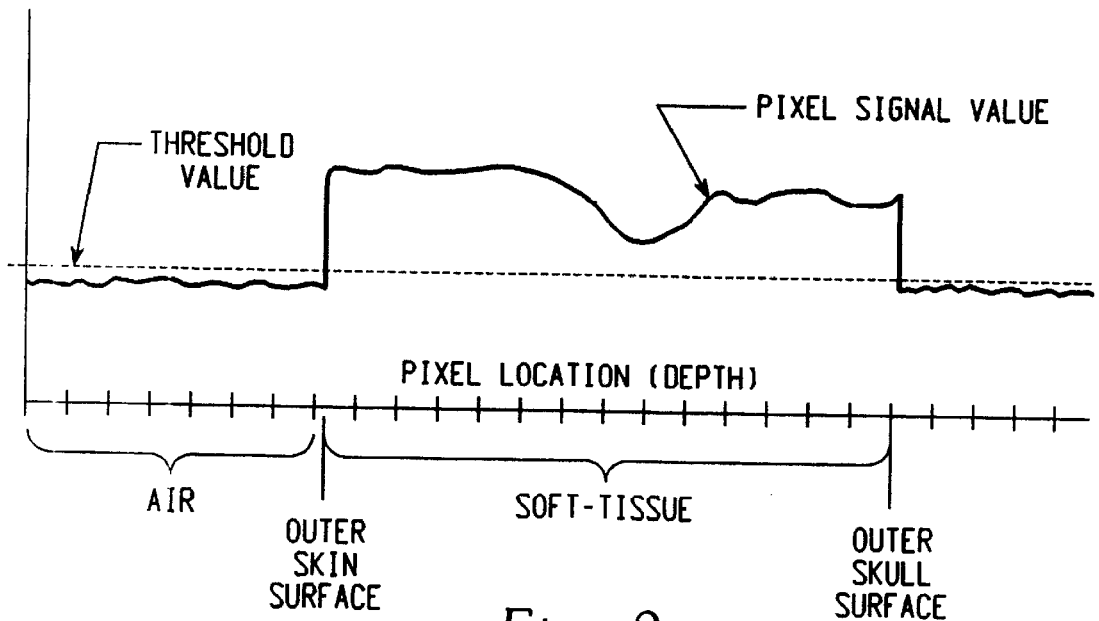
FIG. 2 illustrates a pixel signal value in comparison to a threshold value for sensing an air, at an outer skin surface, within soft tissue and at an outer skull surface.

It is also noted that the investigation of the images of the volunteers, i.e. the progression of the pixel testing, is an investigation of a volume matter. Therefore, the progression discussed is a progression through the air, soft tissue and to the skull. This progression is illustrated in FIG. 2. Particularly, when the pixel signal values obtained are air, i.e. prior to encountering the outer skin surface, the value of the pixel signal and the threshold value are approximately equal. Upon reaching the outer skin surface, the pixel signal value becomes greater than the threshold value and is maintained as greater through the soft tissue until reaching the outer skull surface.

Figure 3:
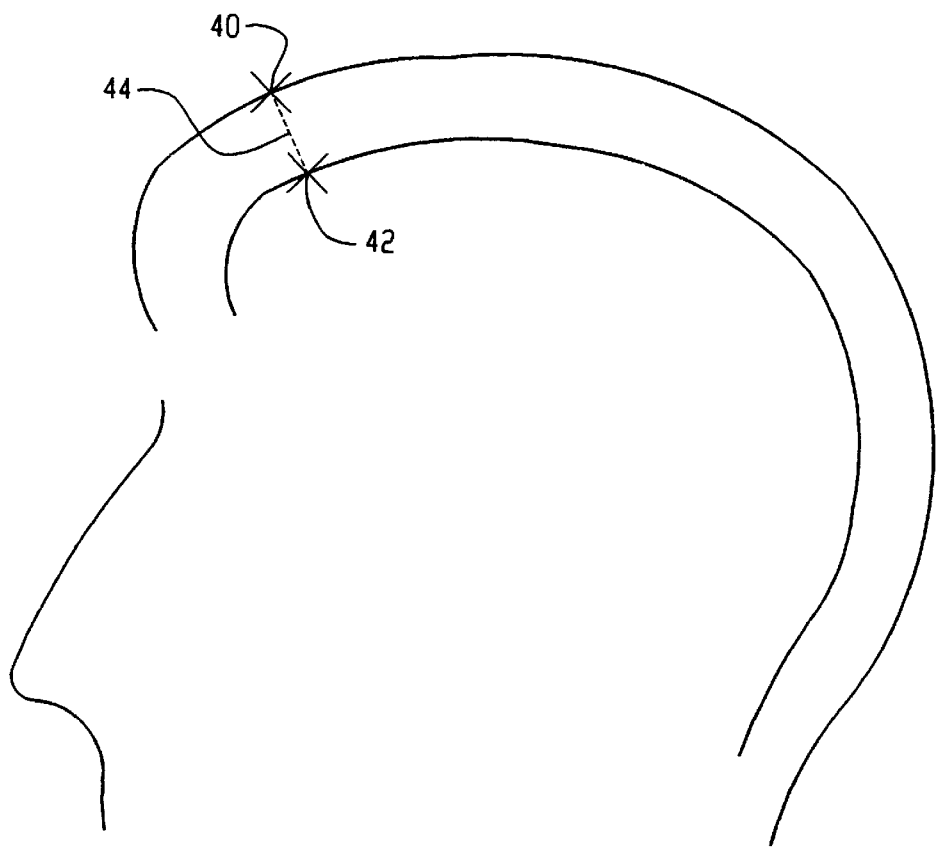
FIG. 3 illustrates an enlarged section of a outer skin surface with soft tissue shown in an enlarged area and an outer skull surface.

FIG. 3 further illustrates the concept of the present invention by showing that once an outer skin pixel location 40 is obtained, and an outer skull pixel location 42 is obtained, the difference between these two locations indicates the depth or thickness of the soft tissue.

v) Using another threshold method, the dark pixels representing the skull's outer surface can be "tagged" while the bright water medium pixels are ignored. Thus, the outer skull surface would be obtained. Once the skull surface has been determined, the difference data could be used to create a face on the skull. Assuming the difference data was actually an average difference for each facial location (across hundreds of subjects), an "average face" could be acquired. However, the manner of creating this face would take into account the bony structures below the skin surface.

Thus, although the distance of the skin from the skull at each pixel location would be an average across a given subject pool, the created face would be based upon the skull itself. Determining the skull surface pixels allows for the difference data to be extracted forward from the skull and leads to the creation of the face. By utilizing this methodology, there are thousands of points available to create the face rather than the currently utilized 26. The same procedure can be done for angles leading away from the coronal view and heading towards the sagittal (side) view of the head. Thus, at completion, a 3-D face (head) is created presenting tens of thousands of pixels used for the facial construction.

5. MRI/CT DATABASE DEVELOPMENT FOR AVERAGE TISSUE THICKNESS

The development of a large database of the aforementioned tissue thickness' is foundational to the present system. Accumulation of data needed to create a database of soft-tissue thickness estimates in male and female volunteer of varying ethnicity, age and weight. The database is compiled from tissue thickness estimates obtained from images obtained from both a Magnetic Resonance Imaging (MRI) scanner as well as a Computed Tomography (CT) scanner.

Using either the MRI and/or CT scans, the tissue thickness methodology described above is applied to each volunteer. Thus, a MRI/CT database is created which contains thickness data for various sexes, races, weights, and ages of people.

Figure 4:
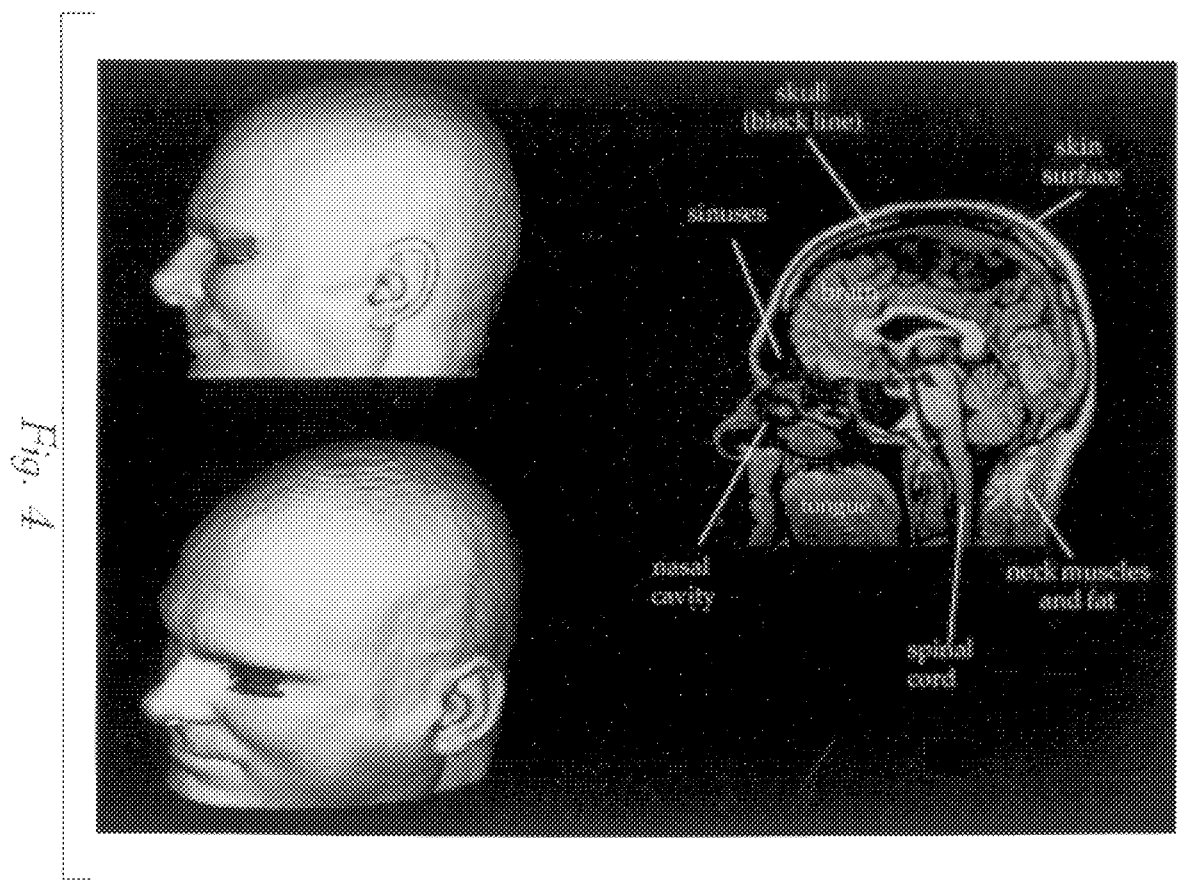
FIGS. 4–6 illustrate various images and phases of the present invention providing for facial reconstruction; and, FIG. 7 is a flow chart of the overall operation of the present invention.
Figure 5:
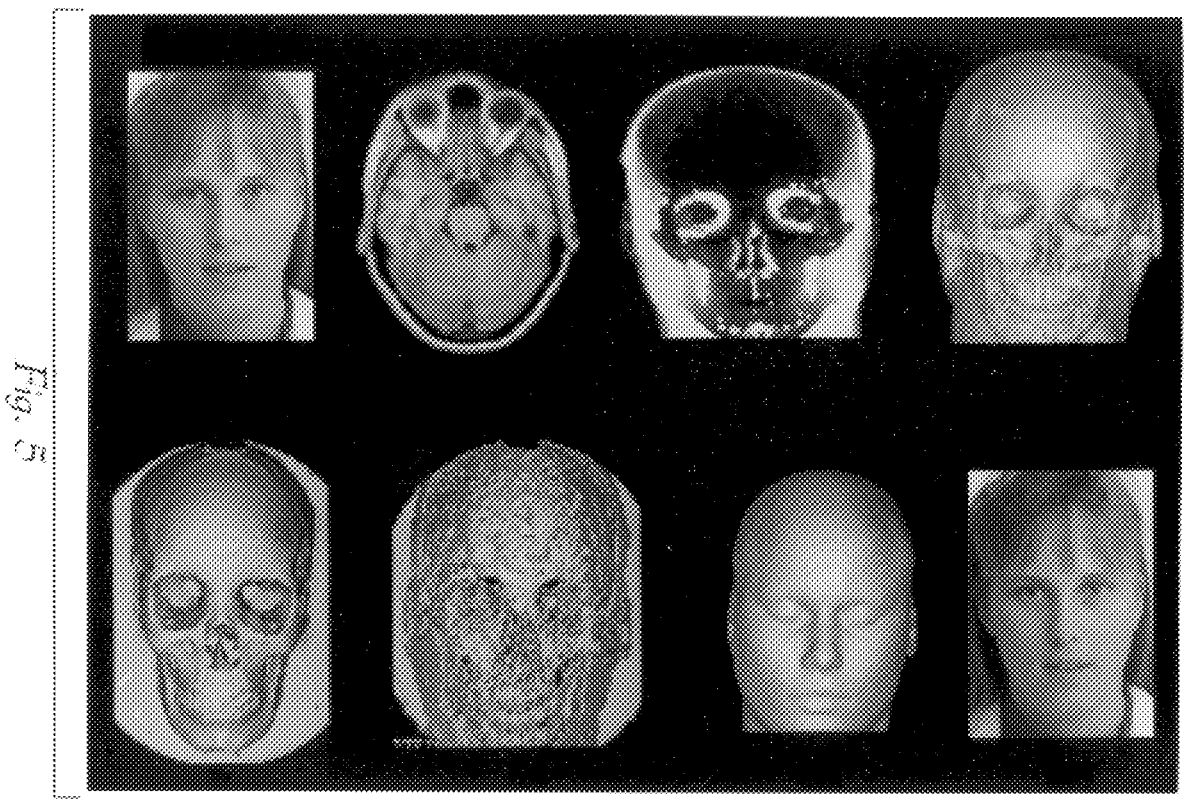
Figure 6:
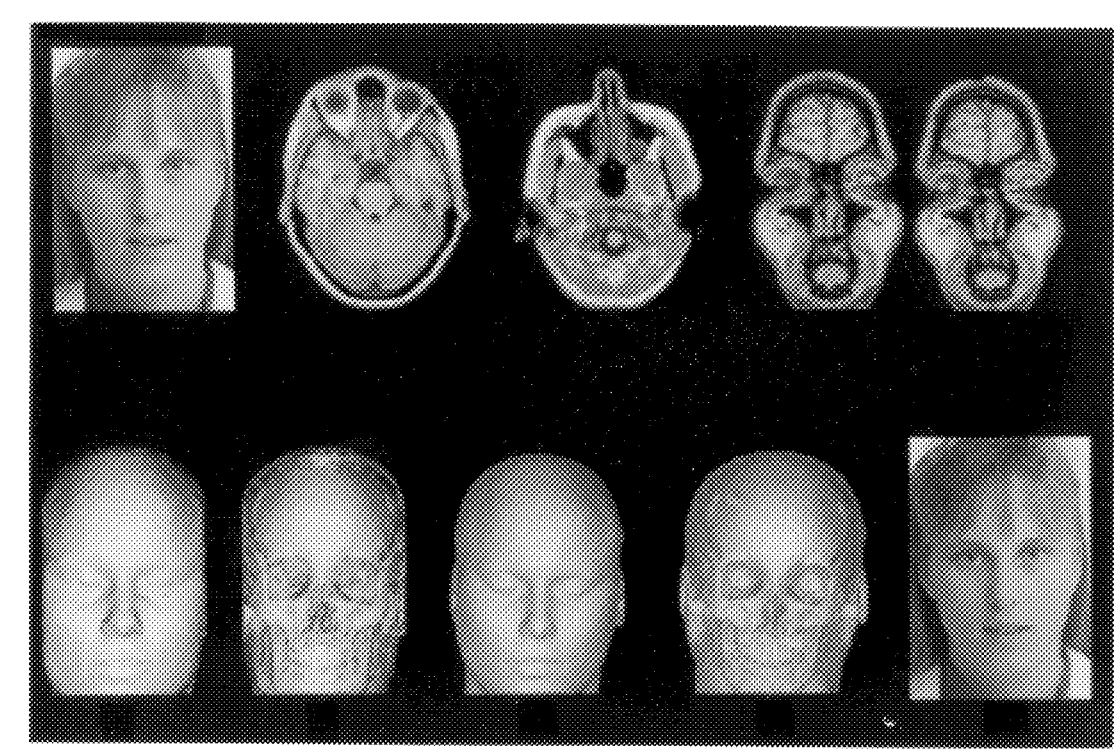

When unidentified skeletal remains are recovered and brought to a center for automated identification, the remains would be tested by experts to determine sex, race, age, and approximate weight of the victim. After those determinations are made, the MRI/CT database can be accessed according to the determined sex, race, age, and weight. As the database continues to grow, thickness averages will be created from the multiple volunteers who fit the description of the database categories. The most recent tissue thickness estimates can be assessed from the database following recovery and categorization of skeletal remains (race, sex, and approximate weight and age). The thickness averages can then be applied to the scanned data of the skull and a face generated for the given skull. For each pixel of the skull data, the thickness average can be applied and the skin surface would be created. This procedure is available for all of the facial pixel data of the skull as well as any other angles desired. The final product will be a computer generated 3-D model of what the person once looked like, as illustrated in FIGS. 4–6. This model will become more accurate over time as the portion of the MRI/CT database which was used became larger through the scanning of additional appropriate volunteers.

6. DATABASE HEADS' SHAPE/SIZE NORMALIZATION TO RECOVERED SKULL SHAPE AND SIZE

Everyone has a skull which is completely distinct from all others. Because of this, all of the volunteers' data must be molded to fit within the constructs of a recovered skull. Yet another aspect of the present invention is normalizing the database data to fit the recovered skull as perfectly as possible. Stretching, bending, shrinking, enlarging, etc. (all forms of "morphing") must all be done to create an accurate mesh between the recovered skull and the average thickness data from a specific segment of the database (e.g., white male, age 35, weight 190) is used for the skin model. This is a critical part of the overall identification process because if the skull doesn't match up with the thickness data properly, an incorrect facial model will be created. Thus the present development encompasses size and shape normalization of volunteers' heads to a control head. The control head in each case being the current skull presented for identification.

7. WEIGHT DETERMINATION USING BONE DENSITOMETRY AND PHYSICAL EVIDENCE

Currently, experts are able to identify the sex, age, and race of recovered skeletal remains to a reasonable level of accuracy. However, determination of the persons body shape (e.g., fat vs. skinny) is not an exact science. It is desirable to determine the weight characteristics of recovered remains to assist in better choosing the portion of the MRI/CT database to use in developing the facial model. Bone densitometry is used to determine the bone mineral content for volunteers of various weights. This data is to be acquired for all volunteers used in the MRI/CT soft tissue thickness database. This parameter field within the database can then be used to obtain a correlation of the bone mineral density with the actual weight of the volunteers. The more volunteers which are scanned, the more accurate the correlation will be between weight and bone mineral density. Upon receiving skeletal remains, this bone densitometry method is used to determine the bones' mineral density. Then the database which correlates mineral density to subject weight is accessed to determine the approximate weight of the unidentified person. This information is then used with the information concerning sex, age, and race to accurately access the MRI/CT database and select the proper volunteer data to use for the skin model creation. In addition to bone densitometry, we would also rely upon any clothing remains or other physical evidence which may provide a better understanding of how much the unidentified person weighed when he/she died. The more evidence available for the weight of the person, the accuracy will be for selecting an appropriate portion of the MRI/CT database.

8. SPEEDY AND OBJECTIVE FACIAL RECONSTRUCTIONS USING COMPUTERS AND THE INTERNET

Use of computers and computer software to create a facial model of unidentified skeletal remains, it is possible to do the facial reconstructions much quicker than current methods allow and without the artistic subjectivity that is prevalent in the current methodology of overlaying clay on the recovered skull surfaces. Using the present development will allow a service in which recovered skulls from throughout the world would be scanned via CT, and the image data sets made available to a centralized site via INTERNET access. The computer systems being utilized are INTERNET accessible and because of this it is possible to access CT scanner skull data from remote sites throughout the world. The skull data could be received within the hour scan completion at the remote site. Current methods require the skull to be physically present so that the artists can study the skull structures in order to eventually create the skin model. In the present development, the electronic dataset version of the skull (via the CT scanned skull image dataset) would be accessible within an hour, and an initial facial model completed via an automated morphing procedure by the next day.

Potentially, our method of identification could be completed within the time it would currently take existing forensic artists to simply obtain physical possession of the unidentified victim's skull. (The artists normally take 3 weeks to 3 months to create the facial model). Our methods require approximately 1 day.

Furthermore, use of computers removes the existing artist subjectivity. Computers are used in the present development to create average thickness' for each pixel of skull data from the many volunteers in the MRI/CT database. The averages are then used to create the skin model. The artists use subjective methods and believe that a skin model will look a certain way from the skull, the 26 points of thickness, and their own inherent opinions. Thus, the artists may create an inaccurate skin model when compared to our model which utilizes more points of reference and average thickness' from a large volunteer pool.

9. PARALLEL USE OF THE METHODOLOGY FOR AGE PROGRESSIONS OF MISSING CHILDREN

The present new development can also be used in a similar manner to do age progressions of children who have been missing for many years. By creating a database of volunteer children who have been scanned, we could determine the amount of change in a missing child's appearance from a picture taken approximately at the age of disappearance and create a new "picture" of the missing child that would depict him/her today. Average changes in tissue thickness could be determined for various sexes, ages, races, and weights of children if volunteer children were followed throughout the course of adolescence. Facial changes could then accurately be predicted by using photographs of the missing children and the average change data from the children database that is created.

Figure 7:
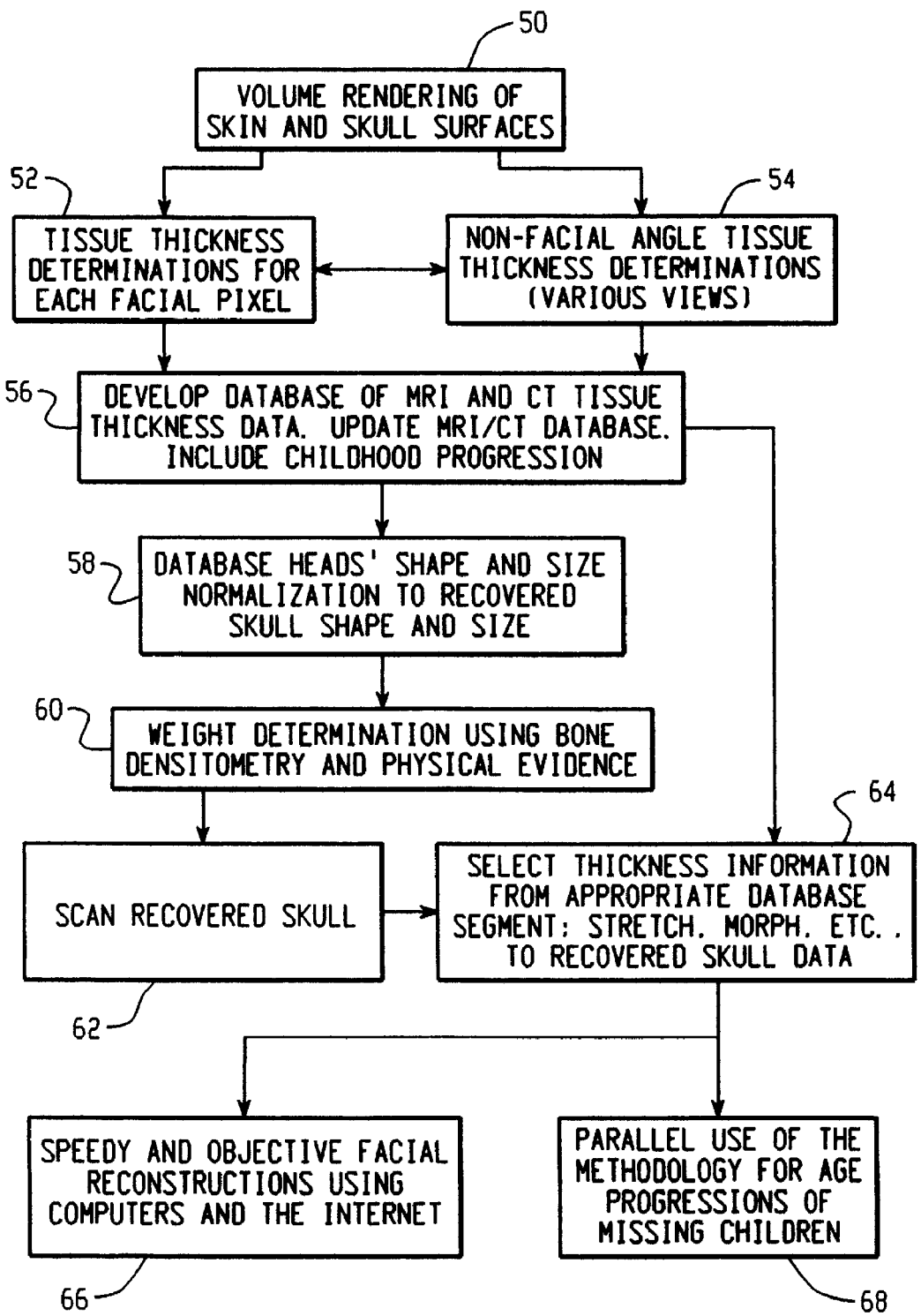

Thus, as illustrated in FIG. 7, the present invention allows for the volume rendering of skin and skull surfaces. The tissue thicknesses provide determinations for each facial pixel, wherein non-facial angle tissue thickness determination, i.e. various views may be obtained. A database using MRI and CT tissue thickness data is developed. The database is designed to be updated and further defined to include additional volunteer information and for more particular categorization including child subjects for child progression imaging development. These features are illustrated in blocks 50–56.

The database heads shape and size are normalized to recovered skull shape and size. Therefore, the recovered skull will always be used in the system and then a normalized or averaged shape and size of the skin surface from the database is used to develop the facial features (block 58 of FIG. 7). It is also taken into consideration the present invention that weight determination using bone densitometry and physical evidence is used for further categorization refinement, block 60.

The present invention is implemented through the use of a scanned recovered skull and using the information of categorization by experts and the appropriate database segment, i.e. age, race, sex, etc. is used. By using digitized images, it is possible to use on-line systems such as the Internet for the facial reconstruction of victims and also for the age progression of missing children, blocks 62–68.

The invention has been described with reference to the preferred embodiment. It is to be appreciated that the above-described functions and means may be performed by an appropriate programmed computer or processor, and the data obtained for such reconstruction may be obtained through the use of MRI, CT or other imaging systems. Obviously, modifications and alterations will occur to others upon reading and understanding the preceding detailed description of the preferred embodiment. It is intended that the invention be construed as including as all such alterations and modifications insofar as they come within the scope of the appended claims or the equivalents thereof.

Having thus described a preferred embodiment, the invention is now claimed to be:

1. A method for facial reconstruction comprising:
   generating a database comprised of facial data representing a thickness of soft tissue located between an outer surface of a skull structure and an outer skin surface for each of a plurality of test subjects;
   categorizing the facial data in accordance with selected categories of the test subjects;
   averaging the facial data of the test subjects within the selected categories to obtain average facial data representing average soft tissue thickness of the selected categories;
   digitizing a skull structure to allow the digitized skull structure to be graphically manipulated;
   matching the skull structure to one of the categories of the facial data in the database;
   generating a facial reconstruction by providing a skin surface to the digitized skull structure in accordance with the average facial data of the corresponding category.

2. The method of claim 1 wherein for each test subject the soft tissue thickness is obtained by,
   selecting a pixel corresponding to a location;
   testing to determine whether a pixel signal corresponding to the pixel is greater or less than a threshold signal value;
   dependent upon results of the testing step, designating the pixel as being at one of an outer skin surface or an outer skull surface.

3. The method of claim 2 wherein the testing step includes testing more than 10 thousand pixels.

4. The method of claim 2 wherein the threshold value selected allows for low-side rendering such that pixels of low intensity within an MRI image data set are used.

5. The method of claim 1 wherein the digitizing of the skull structure is accomplished by MRI or CT imaging.

6. The method of claim 1 wherein the facial reconstruction is accomplished in an on-line computer environment.

7. The method of claim 1 wherein the facial data comprises image data and the step of obtaining the average facial data includes correction of image intensities by providing spatial variation correction.

8. The method of claim 1 wherein the facial data comprises image data and the step of generating facial reconstruction includes rotating a scanned head image data set by an arbitrary angle from a facial view and a step of determining the soft tissue thickness for all pixels at the selected angle, thereby creating a 3-dimensional database of tissue thickness.

9. The method of claim 1 wherein more than 1 million soft tissue data points are used in facial reconstruction.

\* \* \* \* \*